United States Patent [19]
Margulis

[11] Patent Number: 6,057,862
[45] Date of Patent: *May 2, 2000

[54] COMPUTER SYSTEM HAVING A COMMON DISPLAY MEMORY AND MAIN MEMORY

[75] Inventor: Neal Margulis, Cupertino, Calif.

[73] Assignee: Memtrax LLC, Woodside, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/886,237

[22] Filed: Jul. 1, 1997

[51] Int. Cl.$^7$ .................................................. G06F 15/167
[52] U.S. Cl. ........................ 345/512; 345/521; 710/132; 711/168
[58] Field of Search ..................................... 345/501–506, 345/520, 521, 507, 186, 510, 509, 515, 516, 508, 511, 512, 518, 203; 395/309, 311, 312; 711/1, 5, 6, 147–153, 167, 168, 170, 173; 710/100, 129–132

[56] References Cited

U.S. PATENT DOCUMENTS

| | | | |
|---|---|---|---|
| 5,243,447 | 9/1993 | Bodenkamp et al. | 345/133 |
| 5,335,321 | 8/1994 | Harney et al. | 345/503 |
| 5,450,542 | 9/1995 | Lehman et al. | 345/512 |
| 5,454,107 | 9/1995 | Lehman et al. | 711/153 |
| 5,471,672 | 11/1995 | Reddy et al. | 710/116 |
| 5,544,306 | 8/1996 | Deering et al. | 345/507 |
| 5,574,847 | 11/1996 | Eckart et al. | 345/505 |
| 5,666,521 | 9/1997 | Marisetty | 345/525 |
| 5,680,591 | 10/1997 | Kansal et al. | 345/517 |
| 5,715,437 | 2/1998 | Baker et al. | 345/507 |
| 5,720,019 | 2/1998 | Koss et al. | 345/434 |
| 5,748,921 | 5/1998 | Lambrecht et al. | 710/128 |
| 5,790,110 | 8/1998 | Baker et al. | 345/202 |
| 5,790,138 | 8/1998 | Hsu | 345/512 |
| 5,815,167 | 9/1998 | Muthal et al. | 345/512 |
| 5,867,180 | 2/1999 | Katayama et al. | 345/512 |
| 5,892,964 | 4/1999 | Horan et al. | 712/33 |
| 5,911,051 | 6/1999 | Carson et al. | 710/107 |

OTHER PUBLICATIONS

Foley, et al, "Computer Graphics Principles and Practice," Addison–Wesley Publishing Company, 2$^{nd}$ Edition, 1990, pp. 165–179, 856–862.

"Accelerated Graphics Port Interface Specification," Revision 1.0, Intel Corporation, Jul. 31, 1996.

"Plato/PX Integrated Platform Accelerator," S3 Incorporated, Santa Clara, California, Jan. 1997.

Jay Torborg & Jim Kajiya, "Tailsman: Commodity Realtime 3D Graphics for the PC," Siggraph 96.

Gillett, Richard B., "Memory Channel Network for PCI", IEEE Micro, Feb. 1996, pp. 12–18.

*Primary Examiner*—Ulka J. Chauhan
*Attorney, Agent, or Firm*—Carr & Ferrell LLP; Bernard Berman

[57] ABSTRACT

A memory architecture having one or more shared high-bandwidth memory subsystems each coupled over a plurality of buses to a display subsystem, a central processing unit (CPU) subsystem, input/output (I/O) buses and other controllers. The display subsystem receives data from the high-speed shared memory for processing various video and graphics data types for display refresh. Additional buffers and caches are used for the subsystems to further optimize system performance. The display refresh path includes processing of the data from the memory subsystem for output to the display where the data enters the shared memory from an I/O subsystem or from the CPU subsystem.

15 Claims, 9 Drawing Sheets

COMPUTER SYSTEM HAVING A COMMON DISPLAY MEMORY AND MAIN MEMORY

BACKGROUND OF THE INVENTION

1. Field of the Invention

The present invention relates generally to a shared memory subsystem for computer systems and, more particularly, to a shared memory subsystem that can be used for the main memory of the computer system for peripheral devices, such as, a display device.

2. Description of the Background Art

A typical personal computer system has a central processing unit (CPU) with a main memory and a graphics display subsystem with its own memory subsystem. Part of this memory subsystem is a frame buffer that provides the output to the display and part of this subsystem may be used for off-screen operations. However, even the off-screen memory is not part of the main system's pool of memory.

Another typical personal computer system has a single memory subsystem for both the CPU and the graphics subsystem. The performance of this type of computer system is lower than that of computer systems that have separate memory subsystems for the graphics display subsystem and for the CPU. Even though these single memory systems can support a cache memory for the CPU, the overall system performance is still lower because the memory bandwidth is shared between the graphics and CPU subsystems. These computer systems are very limited in their ability to allocate and share areas of memory between the two subsystems and typically require a "static" allocation of the memory areas to either the graphics display or CPU subsystem. The entire memory pool or portions of the memory pool cannot be dynamically switched between the CPU and the graphics display subsystems. These limitations are primarily because the display subsystem cannot address all of the memory space.

For systems that use a single memory subsystem to perform all of the display refresh and drawing operations, performance is compromised by the sharing of the memory bandwidth for these operations along with the CPU's need for memory bandwidth. "Refresh" is the general term for taking the information contained in a frame buffer memory and sequentially transferring rows of information to a palette digital-to-analog converter (DAC) to be displayed on an output device such as a monitor, TV or flat panel display. The entire contents of the frame buffer need to be transferred to the output device continuously for the display to be visible. In the case of a monitor, this is typically between 75 and 95 times per second. For high-resolution color systems, the refresh process may consume an appreciable portion of the total bandwidth available from the memory.

In addition to the refresh bandwidth, the graphics subsystem performs drawing operations that also consume an appreciable amount of bandwidth. In the case of 2D graphics acceleration the drawing operations include Bit-BLt (Bit Block Transfers), line drawing and other operations that use the same common pool of memory.

Intel, and other companies in the PC industry have designed an advanced peripheral port (AGP) bus and an associated system architecture for combining graphics and chipsets. AGP is a second private bus between the main memory controller chipset and the graphics display subsystems. While the CPU can access both the main memory system and the memory associated with the graphics subsystem, the memory associated with the graphics subsystem is not part of the CPU's executable pool of memory and the other peripherals are not able to access the graphics subsystem memory. AGP and the associated system architecture do allow for the storage of 3D texture memory in the main memory that can be accessed by the graphics subsystem. This is one limited use of shared main memory for a graphics function.

AGP is designed to overcome the above-described performance limitations that result when using the main memory subsystem for display refresh and drawing operations. AGP systems overcome this limitation by a brute force requirement that the graphics subsystem on the AGP bus have a separate frame buffer memory subsystem for screen refresh and drawing operations. While the CPU does have some limited read and write access to the frame buffer memory of the graphics subsystem, the CPU can never treat the graphics subsystem memory as a logical extension of the main system memory. The CPU can neither statically nor dynamically allocate the frame buffer subsystem memory as cacheable system memory.

Using frame buffer memory is a good solution for eliminating the performance penalties associated with drawing and refresh operations. However, the specialization of the frame buffer memory reduces its suitability to be fully utilized by the system and thus eliminates one of the primary benefits of the common memory subsystem. Meanwhile, as a frame buffer is always required, AGP systems do not allow for screen refresh to be performed from the main system memory. Additionally, the drawing operations must be performed in the graphics display memory and are therefore performed by the graphics subsystem controller.

Separating the frame buffer memory from the main system memory results in duplicating the input/output (I/O) system data. For example, this occurs in a system where either compressed or encoded video data enters the system over an I/O bus through a system controller and then is stored in the main system memory. If the data is displayed, it needs to be copied into the frame buffer. This results in a second copy of the data, transfer of which requires additional bandwidth.

Another alternative is to have a peripheral bus associated with the graphics controller where the I/O data is transferred to the frame buffer. While this allows display of the data without additional transfers over a system bus, the data remains local to the display subsystem. The CPU or main I/O systems do not have access to the data without using a system bus. For a shared memory subsystem, the I/O data enters the shared memory region. It is then available to either the display subsystem or the CPU.

Figure 1:
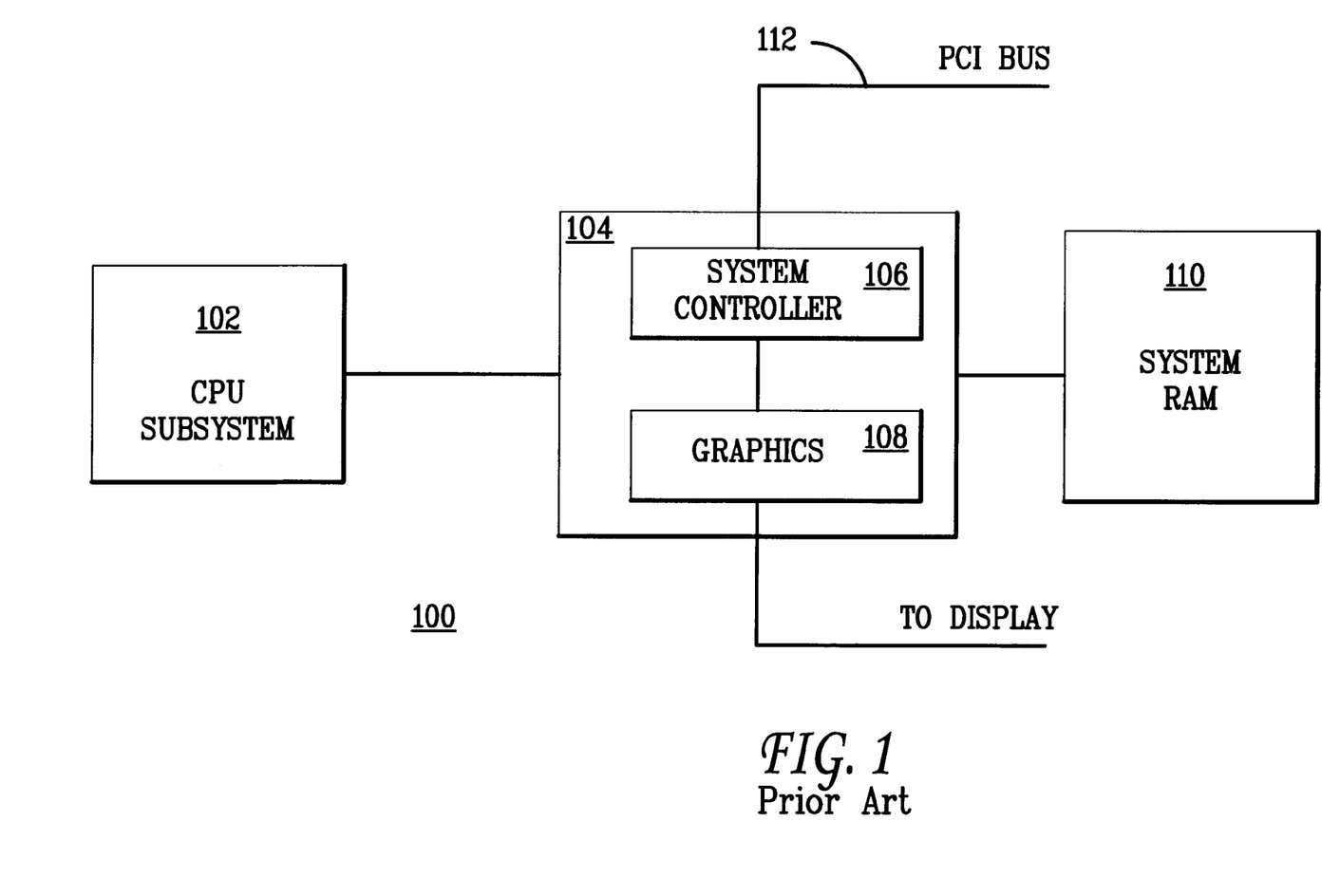
FIG. 1 is a diagram of a prior art memory architecture for a computer system.

FIG. 1 shows a diagram of a standard prior art memory architecture 100. A CPU subsystem 102 is connected to a subsystem 104 which is connected to a system Random Access Memory (RAM) 110 and to a peripheral component interface (PCI) bus 112. Subsystem 104 contains a system controller 106 and a graphics controller 108 that is connected to a display (not shown in FIG. 1). The system has a single memory subsystem for both the graphics display and CPU 102.

Figure 2:
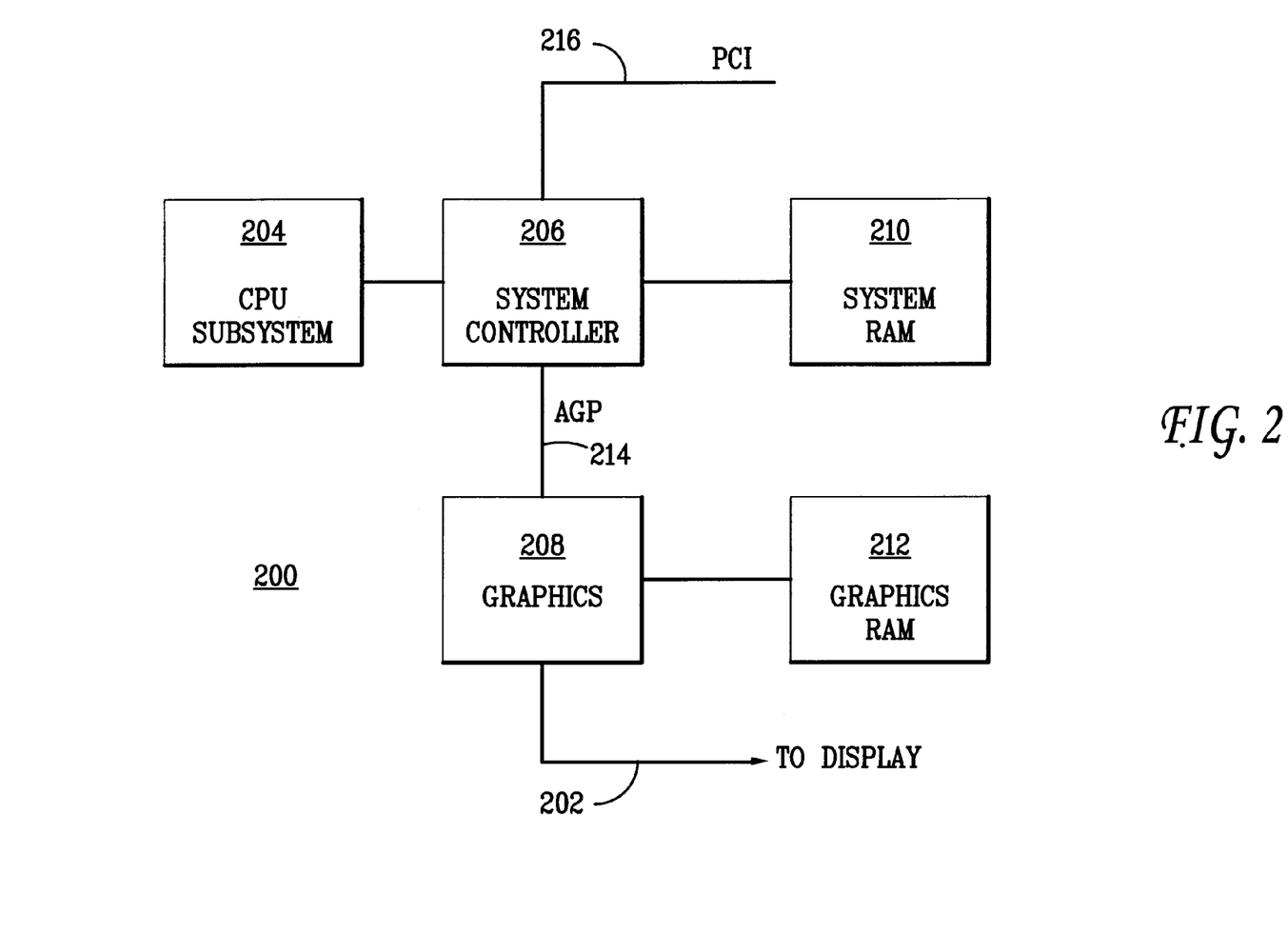
FIG. 2 is a diagram of another prior art memory architecture for a computer system.

FIG. 2 is a diagram of the current state of art personal computer memory architecture 200 having separate memories for the CPU and for the graphics display. A CPU subsystem 204 is connected to a system controller 206 that is connected to a system RAM 210 and to a PCI bus 216. System controller 206 is also connected through a dedicated AGP bus 214 to a graphics controller 208 that is connected to a graphics RAM 212 and to a display 202. CPU subsystem 204 can not treat graphics RAM 212 as an extension of system RAM 210, and graphics subsystem 208 can not use system memory 210 for display refresh.

What is needed is a memory architecture in which common memory can be used for display memory and main memory, without having inadequate bandwidth access to the common memory impair performance.

SUMMARY OF THE INVENTION

The present invention resides in a memory architecture having one or more high bandwidth memory subsystems. Each of the shared high bandwidth memory subsystems is connected over a plurality of buses to a display subsystem, a central processing unit (CPU) subsystem, input/output (I/O) buses and other controllers. A display subsystem is configured to receive various video and graphics type data from the high-speed shared memory and to process it for display refresh. Additional buffers and caches are used for the subsystems to optimize system performance. The display refresh path includes processing of the data from the memory subsystem for output to the display, where the data enters the shared memory from an I/O subsystem or from the CPU subsystem.

DETAILED DESCRIPTION

The present invention resides in a memory architecture having one or more shared high-bandwidth memory subsystems. Each of the high-bandwidth memory subsystems is connected over a plurality of buses to the display subsystem, the central processing unit (CPU) subsystem, the input/output (I/O) buses and other controllers. The display subsystem is configured to receive from the high-speed shared memory various video and graphics data types for processing and display refresh. Additional buffers and caches are used for the subsystems to optimize the system.

Figure 3:
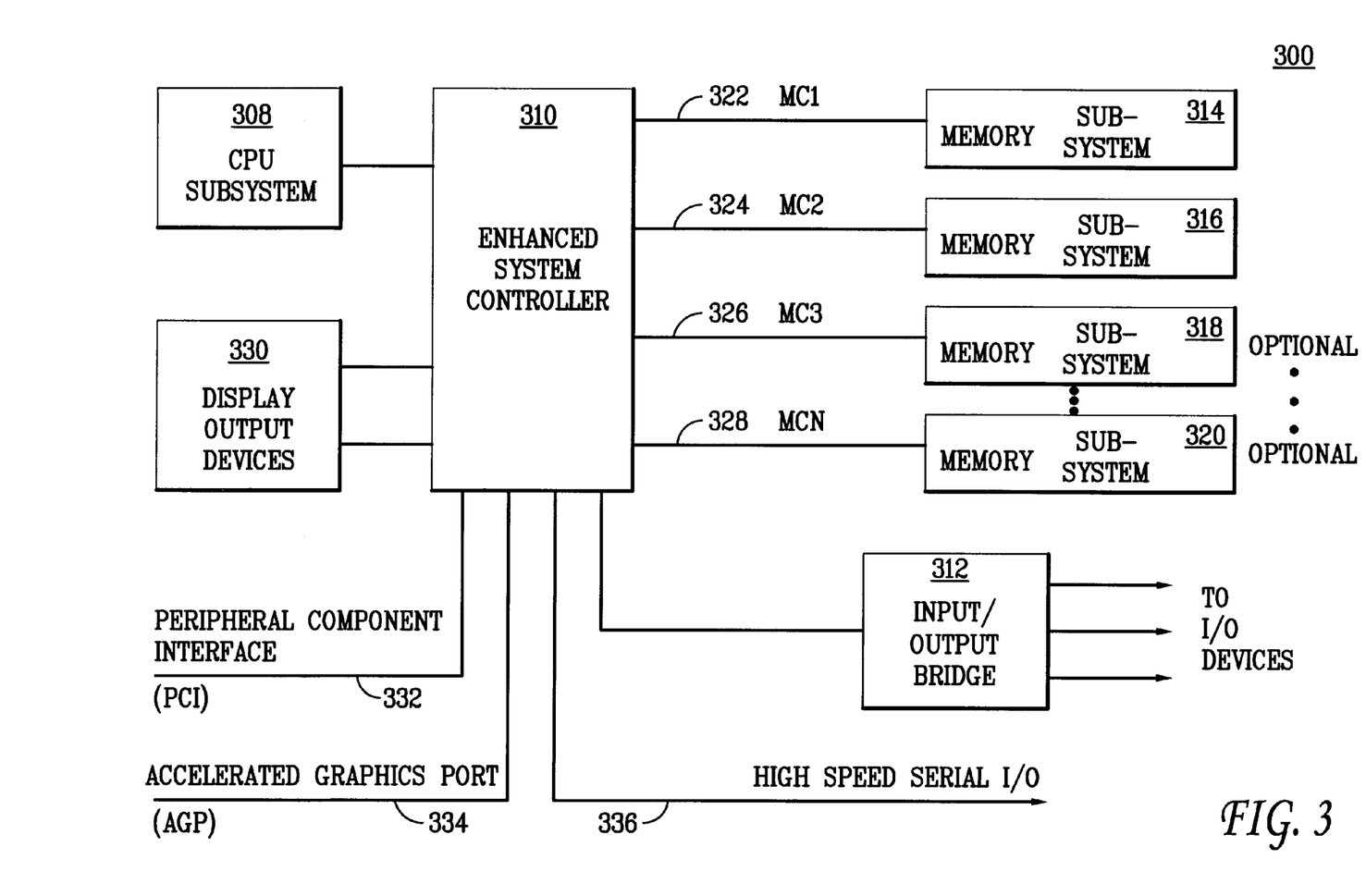
FIG. 3 is a diagram of an exemplary embodiment of a computer system having a common display memory and main memory.

FIG. 3 shows a system block diagram 300 of an exemplary embodiment of the present invention, including a CPU subsystem 308 connected to an enhanced system controller 310 which is in turn connected through memory channel MC1 322 to a memory subsystem 314, through memory channel MC2 324 to a memory subsystem 316, through memory channel MC3 326 to a memory subsystem 318, and through memory channel MC4 328 to a memory subsystem 320. Each memory channel includes independent controls and may contain multiple banks of memory. Enhanced system controller 310 is also connected to an input/output bridge 312, display output devices 330, a PCI bus 332, an advanced peripheral port (AGP) 334, and a high-speed serial I/O port 336.

A low cost multimedia personal computer system can be designed by optimizing a system with respect to memory bandwidth to share one or more common memory subsystems for aspects of display memory and for main system memory. The FIG. 3 common memory subsystem gives flexibility for sharing the available bandwidth as well as for sharing the pool of memory. The shared memory subsystem bandwidth can be allocated either to display operations or to the primary CPU and main I/O system. The common pool of memory can be allocated, depending on the application and operating system, to support display memory such as textures or buffers and alternatively can be allocated to the rest of the system to support CPU code, data or peripheral system swap areas for I/O devices in the system. Additionally, the common pools of memory can be dynamically shared with common data that is used by both the display subsystem and the other system functions.

Figure 4:
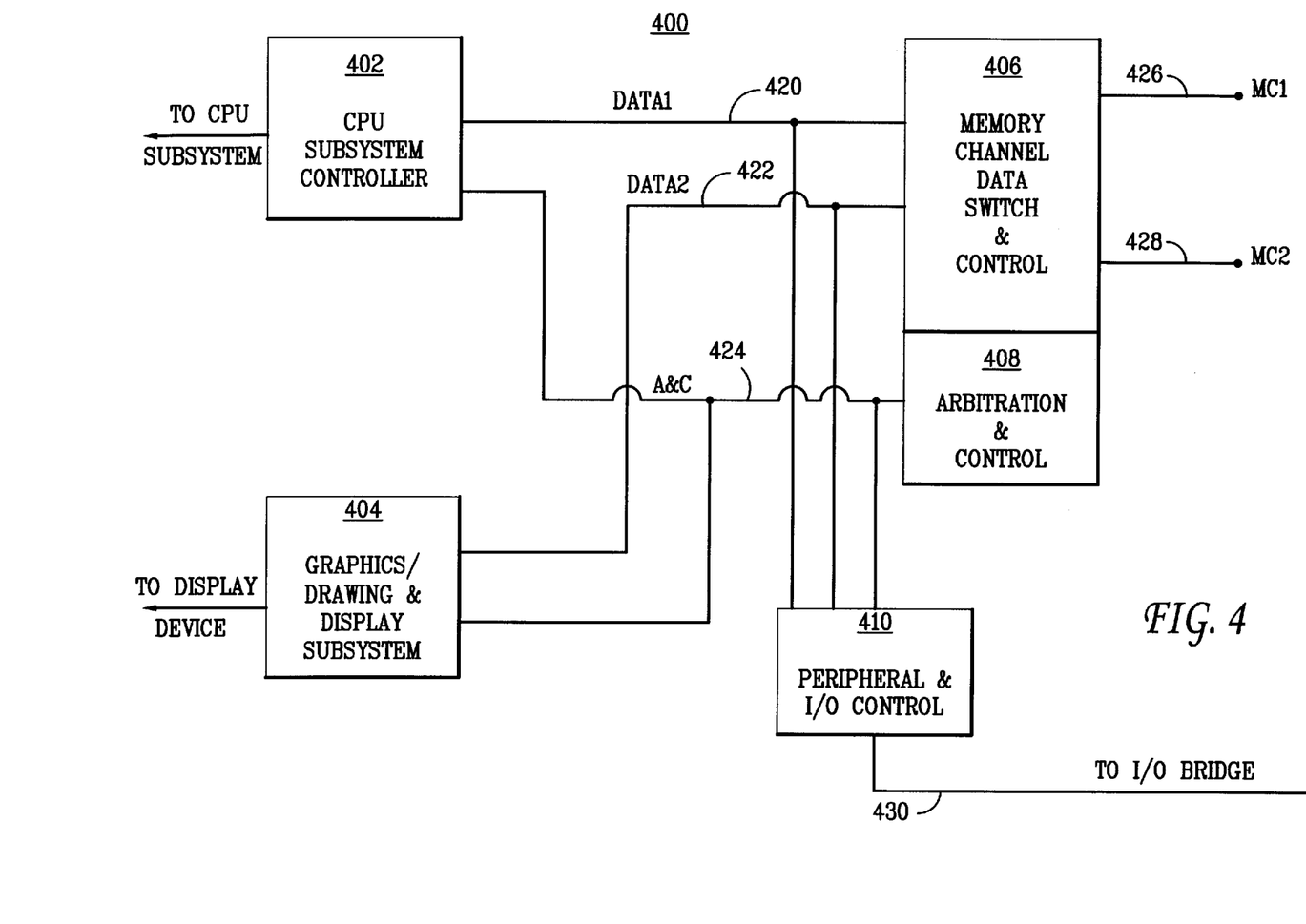
FIG. 4 is a diagram of an exemplary embodiment of the system with a common display memory and main memory.

FIG. 4 shows a system block diagram 400 of an exemplary embodiment of the present invention, including a CPU subsystem controller 402 connected to a graphic/drawing and display subsystem 404, a memory channel data switch and control unit 406, an arbitration and control unit 408 and a peripheral I/O control unit 410. CPU subsystem controller 402 is also connected to a CPU subsystem (not shown). Graphic/drawing and display subsystem 404 is connected to a display device (not shown), to the memory channel data switch and control unit 406 and to the arbitration and control unit 408. The memory channel data switch and control unit 406 is also connected to memory channels MC1 426 and MC2 428 (not shown). The peripheral I/O control unit 410 is also connected to an I/O bridge 430 (not shown).

There are two data buses in the FIG. 4 implementation. One data bus (DATA1) 420 is primarily used by the CPU subsystem for accessing the common memory. A second data bus (DATA2) 422 is primarily used by the graphics drawing and display subsystem 404. Having two data buses allows concurrent accesses of memory by the CPU controller 402 and by graphics drawing and display subsystem 404. Peripheral and I/O controller 410 shares the data bus of either CPU controller 402 or graphics drawing and display subsystem 404.

This implementation shows a shared address and control (A&C) bus 424.

Arbitration and control unit 408 is responsible for responding to requests from CPU subsystem controller 402, graphics drawing and display subsystem 404 and peripheral and I/O control unit 410, and scheduling their memory accesses. Arbitration and control unit 408 includes a set of configuration and state registers (not shown) that processes requests intelligently. Additionally, the request protocol specifies the amount of data required by the requester. Arbitration and control unit 408 processes the requests with the objectives of maximizing concurrency of the two data buses, optimizing for the length of the transfers and assuring that the latency for requests does not compromise system performance. To meet these sometimes conflicting objectives, arbitration and control unit 408 tracks the state of the memory channels as well as the latency of the requests that occur. Arbitration and control unit 408 is able to break a single request from a subsystem into multiple requests to the memory channels. By doing this, the latency can be managed and the memory bursts can be optimized. Also, the requesting subsystems can request very long bursts of data without concern for unbalancing the system throughput and without having to reuse the A&C bus 424.

Figure 5:
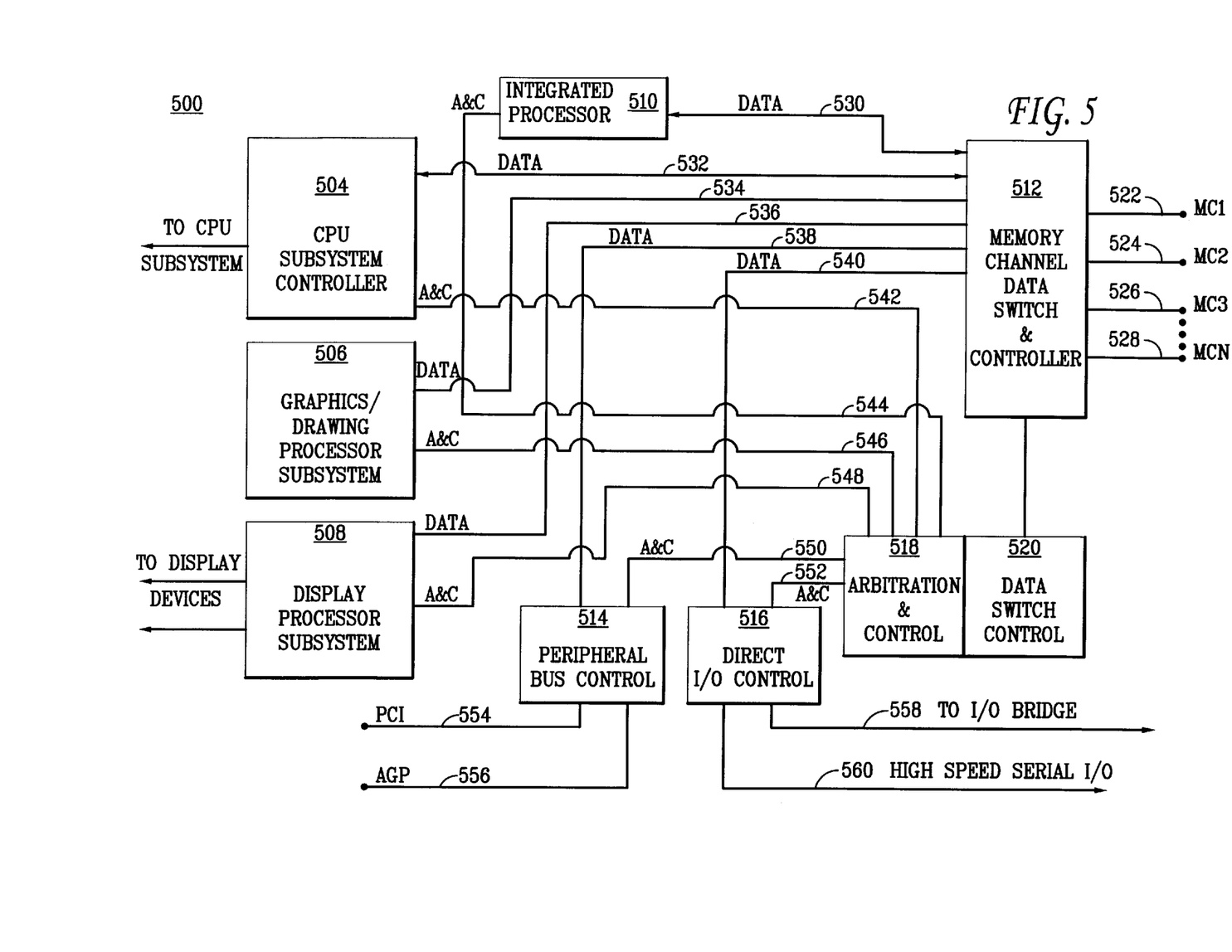
FIG. 5 is a diagram of an exemplary full-function embodiment of the new enhanced system with a common display memory and main memory.

FIG. 5 shows a system block diagram 500 of an exemplary embodiment of an enhanced CPU subsystem controller 504 connected by with a data bus 532 to a memory channel data switch and controller 512 and connected by a control bus 542 to an arbitration and control unit 518. System 500 also includes a graphic/drawing processor subsystem 506 connected by a data bus 534 connected to memory channel data switch and controller 512 and connected by a control bus 546 to arbitration and control block 518. System 500 also includes a display processor subsystem 508 connected by a data bus 536 to the memory channel data switch and controller 512 and with a control bus 548 connected to the arbitration and control unit 518. FIG. 5 also shows the memory channel data switch and controller 512 is connected to an integrated processor 510 by a data bus 530, connected to a peripheral bus control unit 514 by data bus 538, connected to a direct I/O control unit 516 by a data bus 540 and the data switch control unit 520. Memory channel data switch and controller 512 has outputs for memory channels MC1 522, MC2 524, MC3 526 and MC4 528.

FIG. 5 shows the peripheral bus control unit 514 is connected by control bus 550 to the arbitration and control unit 518 and connected to two buses PCI 554 and AGP 556. The direct I/O control unit 516 is connected by control bus 552 to the arbitration and control unit 518 and connected to an I/O bridge 558 and a high-speed serial I/O port 560. FIG. 5 shows the integrated processor 510 is connected by control bus 544 to the arbitration and control unit 518.

FIG. 5 shows a more extensive implementation 500 of the base system 400 described in FIG. 4. System 500 includes more potentially concurrent data buses, additional A&C buses and additional requester subsystems such as the integrated processor 510. Note that the graphics drawing and display processor is broken into two requester subsystems, the graphics drawing processor subsystem 506 and the display processor subsystem 508, each with their own paths to memory channel data switch and controller unit 512 and to arbitration and control unit 518. The graphics drawing processor subsystem 506 and the display processor subsystem 508 could be broken up to each support multiple data paths in a more elaborate system.

The integrated processor 510 included in FIG. 5 could perform any number of functions. Examples include a geometry and lighting engine for 3D graphics, an MPEG-2 decoder, an audio processor or some type of audio or video compression engine. Any of these subsystems would include a processor and local memory.

Figure 6:
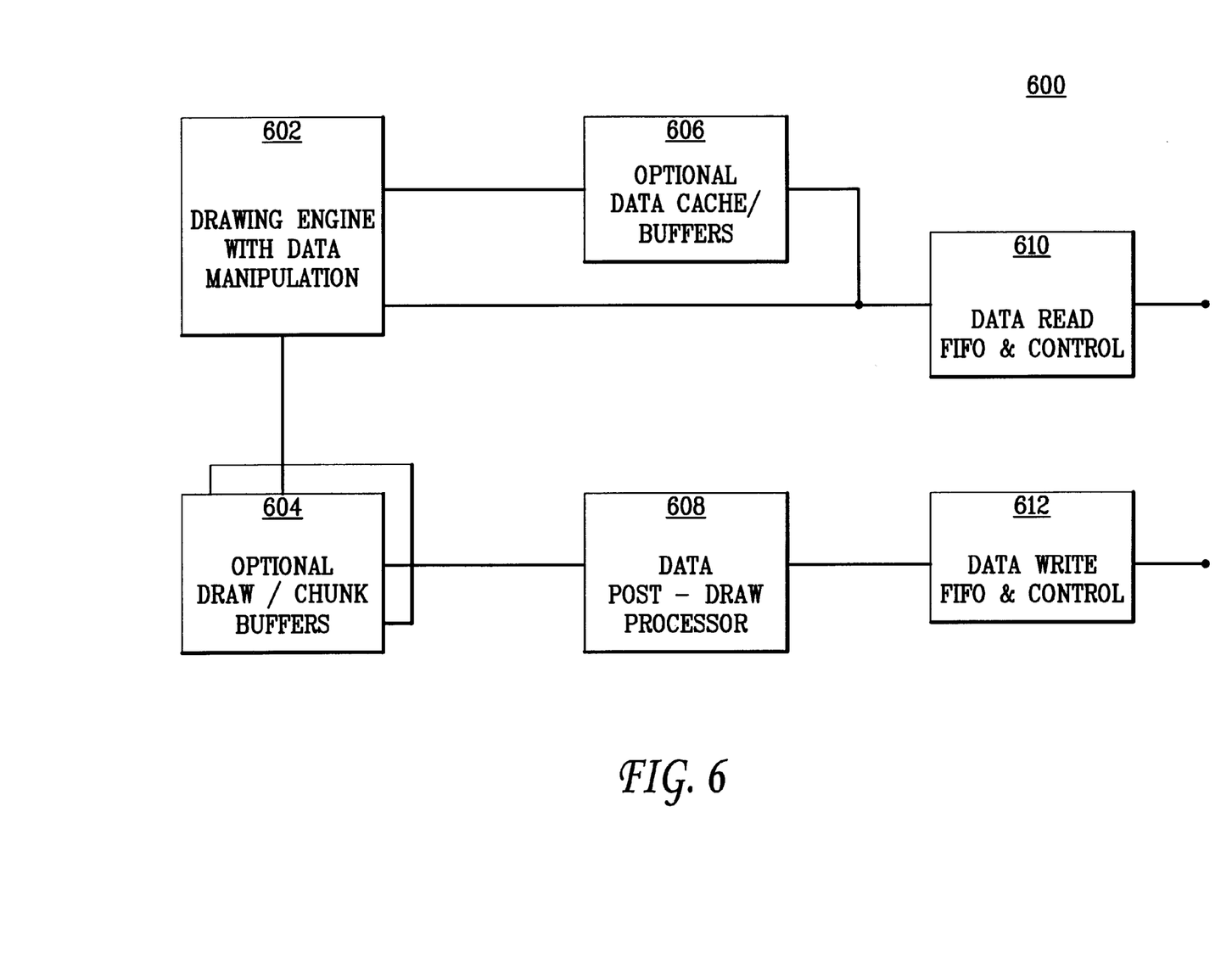
FIG. 6 is a diagram of a more detailed graphics/drawing processor subsystem.

FIG. 6 is a diagram of an exemplary graphics/drawing processor subsystem 600, including a drawing engine with a data manipulation unit 602 connected to optional draw/chunk buffers 604, to optional data cache buffers 606 and to a data read First-In-First-Out (FIFO) and control unit 610. The optional data cache buffers 606 are also connected to block 610. The optional draw/chunk buffers 604 are connected to a data post-draw processor 608, which is connected to a data write FIFO and control unit 612. The read and write FIFOs are used to smooth-out data transfers across the buses and to optimize for data bursts.

One of the primary operations of the drawing engine with a data manipulation unit 602 is drawing operations. These include both simple 2D operations such as bit-block transfers (Bit-Blts) and complex 3D operations such as texture mapping and Z-buffering. Drawing operations can be optimized in several ways that will improve the drawing performance and reduce the bandwidth requirements of the system memory.

One optimization is the data cache/buffers 606. This local memory can store a queue of commands or for a variety of data formats such textures, Z-buffer information or vertex information, and can reduce the amount of reads that need to go across the data bus.

One of the key aspects of 3D graphics is texturing, which involves reading samples from texture maps and, based on the samples, producing output pixels. Rather than re-read each texture sample from the system memory, the samples can be cached local to the graphics controller. The texture cache can store texture samples in whatever formats the graphics controller needs, including compressed formats such as VQ (vector quantization) or BTC.

Like texture values in a texture cache, Z-buffer values can be cached local to the graphics controller to reduce the number of fetches from the unified system memory. And, as in the texture and Z-buffer caches, the vertex information can be cached local to the graphics controller to reduce the number of fetches from the unified system memory.

3D graphics typically outputs drawings into a frame buffer. A complete frame buffer can be integrated into the graphics/drawing processor subsystem of some systems. In systems where it is not possible to integrate a complete frame buffer, there is still significant performance to be gained by having a partial drawing buffer. A partial drawing buffer is particularly helpful for 3D where a technique called "chunking" can use a chunking buffer to filter out multiple writes to the frame buffer.

Chunking allows an output frame to be divided into representative portions called "chunks". Each chunk is fully drawn by going through the complete 3D operations that affect all outputs to that portion of the screen. Because 3D images have a depth element, there are usually multiple writes to each output pixel to complete a frame. The average number of writes is often referred to as the scene's depth complexity. For example, a frame with a depth complexity of four means that on average each destination pixel is written four times before the final output pixel is produced. As a first order calculation, the depth complexity absorbed by the chunking buffer is directly proportional to the system memory bandwidth saved.

Since the chunking buffer represents only a portion of a frame, the completed chunks must be transferred to the unified memory system where the complete frame can be built for subsequent display. Optional draw/chunk buffers 604 can reduce the amount of write traffic generated by the graphics/drawing processor subsystem 602. Draw/chunk buffers 604 have a shared data path along with the rest of the graphics/drawing processor subsystem 602. The draw/chunk buffers 604 are copied via a DMA operation back to the unified memory. To further improve performance, two draw buffers can be utilized in a double-buffered fashion so that while one draw buffer is being operated on by the graphics controller, the other draw buffer is being copied back to the unified memory. The buffers are then switched in a ping-pong fashion so that they are each being drawn and alternately copied back to memory.

Data from the draw/chunk buffers 604 may pass through an additional data post-draw processor 608. As an additional optimization, data in the chunking buffer can be dithered, encoded or compressed while being written back to the unified memory. In proportion to the compression ratio, this saves additional bandwidth. Because the frame will later also be read out of the unified memory by the display controller, the total bandwidth savings is approximately twice the compression ratio. Since chunking data is 3D image data, it lends itself to a lossy compression algorithm, though a lossless scheme could also be used. Draw/chunk buffers 604 that contain enough memory for the entire display can be used directly by the refresh control logic for display to the output device.

Figure 7:
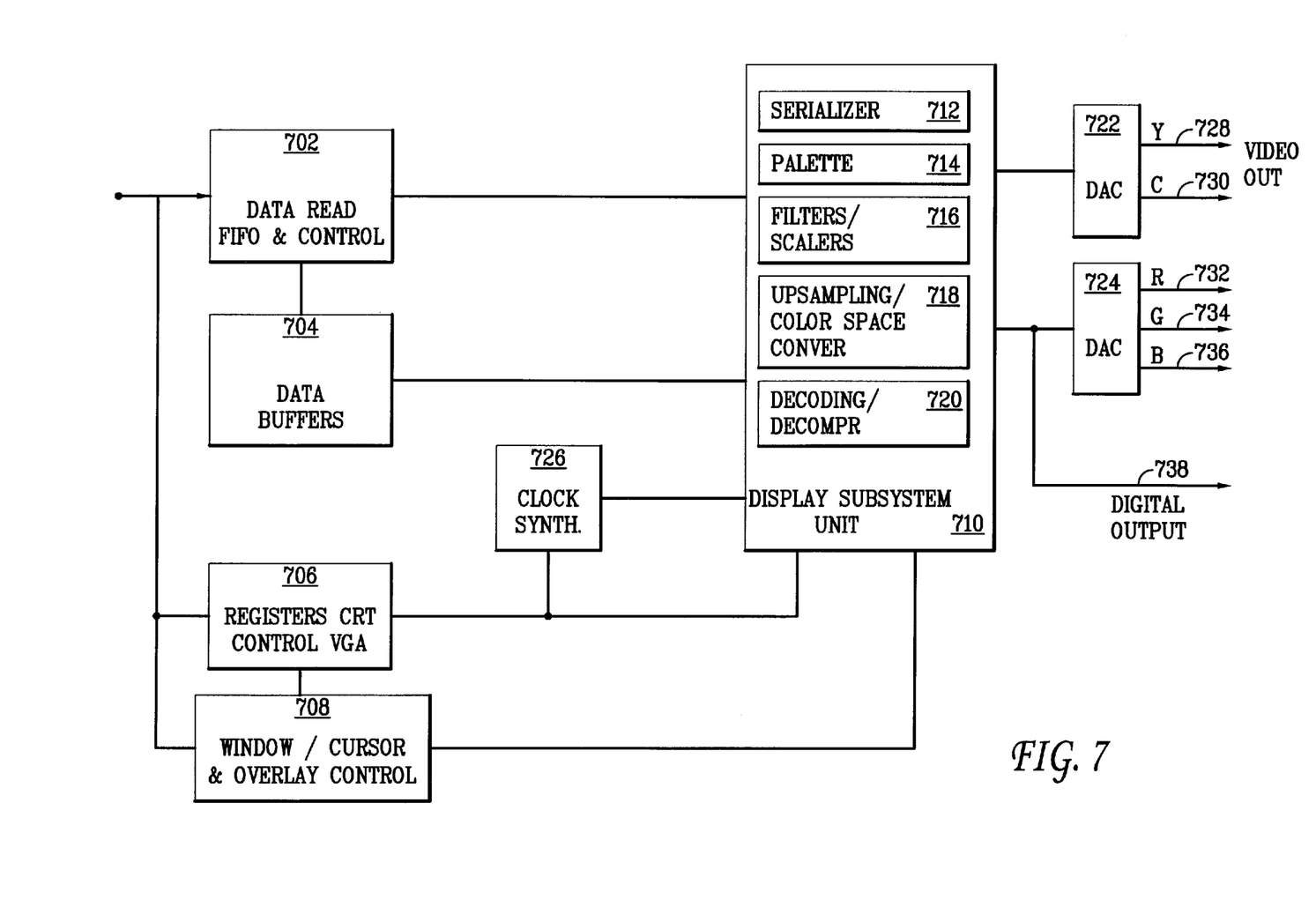
FIG. 7 is a diagram of an exemplary display processor subsystem.

FIG. 7 is a diagram of an exemplary display processor subsystem 700, which is primarily responsible for reading data from the memory subsystem and performing the functions necessary for the data to be output to the display device or devices. Display processor subsystem 700 has significant processing capability and can construct complete outputs from various formats of data that can be stored in different regions of system memory. The display processor subsystem 700 can generate output based on combinations of data that entered the system memory directly from a peripheral and I/O controller or that was manipulated by either the CPU or the graphics/drawing and display processor. A data read FIFO and control unit 702 is connected to data buffers 704 and to a display subsystem unit 710 containing a serializer 712, a palette 714, filters/scalers 716, an upsampling color space converter 718 and decoder/decompressor 720. The FIFO is useful for buffering bursts of data coming from the memory channel. The display processor subsystem 700 also includes a data buffer 704 which can store data. This is useful for data that will be read multiple times, which, by being stored locally, will not have to be re-read from the main memory.

As shown in FIG. 7, CRT control unit 706 has registers connected to a window/cursor overlay control block 708, to a clock synthesizer 726 and to the display subsystem unit 710. The window/cursor overlay control unit 708 is connected to the display subsystem unit 710.

Display subsystem unit 710 has a digital video output 738 that can be utilized by a device that accepts digital data or by an external DAC. Unit 710 also has outputs connected to DAC 722 and DAC 724 for display outputs that require analog signals. DAC 722 outputs video signals Y 728 and C 730 and DAC 724 outputs video signals R 732, G 734 and B 736 for both a video monitor and a graphics monitor.

The display processor subsystem 700 requires a significant number of registers to reflect the output device characteristics, such as the resolution and the refresh rate. VGA-compatible systems have additional CRT register formats that must be adhered to. There is a separate set of registers for each output device. Since proper output is often based off of a clock frequency, system 700 includes a clock synthesizer 726 that can generate various frequencies to help map data to an output device.

In order to allow different programs to display data on different portions of an output device and to support a variety of window overlays, clipping techniques and a cursor, modern computer software interfaces support a windowing environment which require a set of registers shown in FIG. 7. Register information is also required to determine the type of data that each window contains as well as pointers to the location in the main memory at which the data is stored. Since data in each window may be operated on differently, an elaborate coordination system is required to assure proper output.

The display subsystem unit 710 of FIG. 7 contains elements for processing the data read from the main memory prior to being sent to output devices. The sequencing of these processing blocks varies for different data windows. In general, the serializer 712 takes parallel data streams and breaks them into the proper format for DACs 722 and 724. The palette 714 is a look-up table that translates an input into a potentially different data output. This can expand 8 bit color indices into 24-bit color indices or convert color spaces or provide gamma corrections.

Also shown in the display subsystem unit 710 is filters/scalers 716 for smoothly changing the resolution of an image. Up-sampling and color space conversion logic 718 may also be used for processing an image. The decoder and decompression logic 720 is needed for data that has been compressed, encoded or simply dithered.

Figure 8:
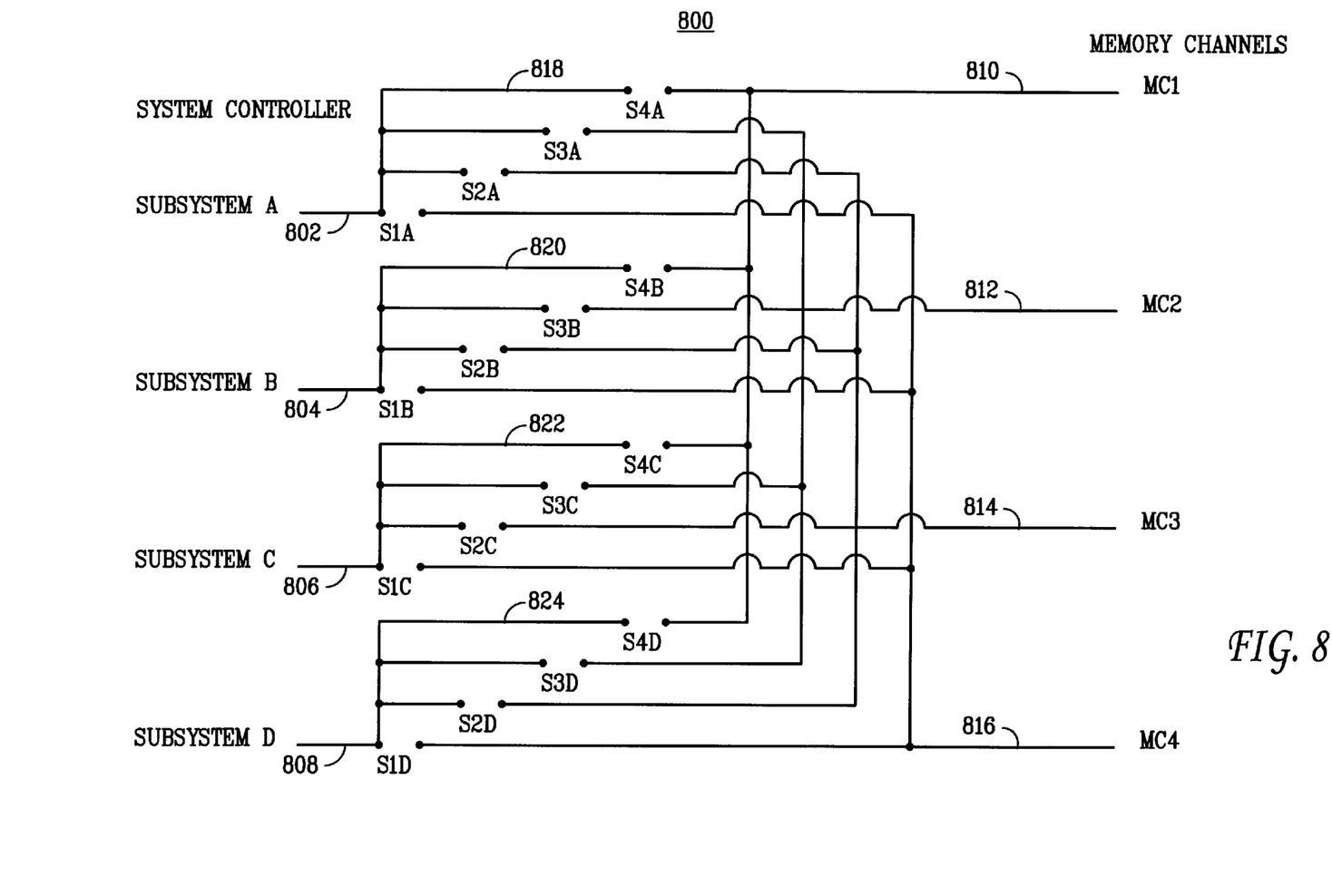
FIG. 8 is a diagram of an exemplary 4×4 crossbar data switch.

FIG. 8 shows a diagram of an exemplary 4×4 crossbar data switch 800. The system controller outputs for subsystem A 802, B 804, C 806 and D 808 can be routed selectively by means of switches SNA 818, SNB 820, SNC 822 and SND 824 to memory channels MC1 810, MC2 812, MC3 814 and MC4 816, where N can be 1, 2, 3, or 4. While the actual configuration of the switch varies in the implementation, FIG. 8 shows the complete capabilities for four subsystem controllers and four memory channels. The crossbar data switch 800 allows four separate data paths to be concurrent through the switch. When any one controller is utilizing one of the memory channels, the other controllers are not blocked from accessing the other three memory controllers.

For example, if subsystem A is accessing channel MC3, the switch labeled S2A is active. Concurrently, subsystem B may be accessing channel MC4 with switch S1B closed, and subsystem C may access channel MC1 with switch S4C, while subsystem D accesses channel MC2 through switch S3D. If a subsystem needs to connect to a memory channel that is in use by another subsystem, it is blocked and must wait.

Figure 9:
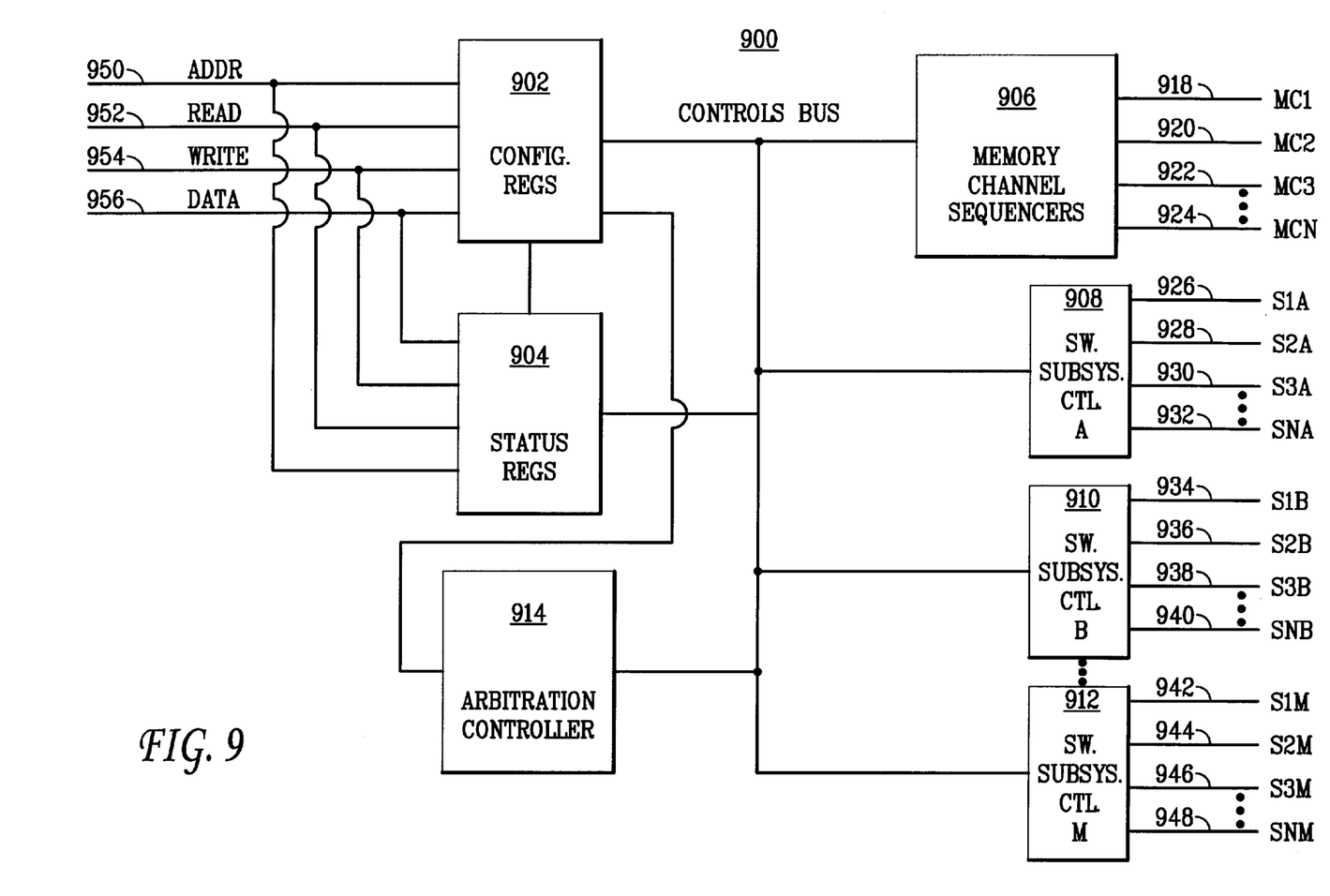
FIG. 9 is a diagram of an exemplary arbitration and data switch control architecture.

FIG. 9 shows a diagram of an exemplary arbitration and data switch control architecture 900. The configuration registers 902 and status registers 904 receive an address from input 950, a read from input 952, a write from input 954 and data from input 956 and output control information via controls bus 916 to the memory channel sequencers 906 and the switch subsystem control units A 908, B 910, through M 912. The memory channel sequencers 906 produce signals on control lines for each memory subsystems MC1 918, MC2 920, MC3 922 through MCN 924. Switch subsystem control unit A 908 produces signals on lines S1A 926, S2A 928, S3A 930, through SNA 932. Switch subsystem control unit B 910 produces signals on lines S1B 934, S2B 936, and S3B 938 through SNB 940. Switch subsystem control unit M 912 produces signals on lines S1M 942, S2M 944, and S3M 946 through SNM 948. Each control block has N number of control lines. For the 4×4 switch shown in FIG. 8, N and M are both 4.

The configuration registers 902 are set to reflect the nature of the subsystem controller. These characteristics can include the burst lengths, the latency tolerance and other addressing information. Configuration information is also required for the memory channel information. The status registers 904 track both pending requests from the switch subsystem controllers 908, 910 and 912 and the status of the memory channels 918, 920, 922 and 924.

Arbitration controller unit 914 receives memory requests from each of subsystems 908, 910 and 912. By using the configuration register 902 information as the status information, arbitration controller unit 914 acknowledges requests at appropriate times and signals memory channel sequencers 906 and switch subsystem controllers 980, 910 and 912 to cycle through the memory requests.

Arbitration controller unit 914 needs to ensure that the subsystems that have maximum latency tolerances are not compromised. Additionally, arbitration controller unit 914 needs to maximize the total bandwidth of the system to achieve the best performance. In some cases bursts are not broken up so that they can complete the use of a memory channel. In other cases, a single subsystem controller request is broken up and filled with multiple memory channel accesses.

An enhanced system with a common display memory and main memory can have a plurality of memory subsystems, each having its own memory channel, wherein the memory channels can be allocated to a plurality of processor or peripheral subsystems. An enhanced system can have a plurality of memory subsystems, each with its own memory channel, that are allocated to a plurality of processor or peripheral subsystems with equal priority or with priority preferences. An enhanced system can assign one of the memory subsystems, each having its own memory channel, to be a display memory that can also function as a main system memory. An enhanced system can assign one of the memory subsystems, each having its own memory channel, to be a display memory wherein a display refresh occurs from main memory.

An enhanced system with a common display memory and main memory can have a graphics controller that can draw directly into any area of the main memory. An enhanced system with a common display memory and main memory can allow data from a peripheral bus to be transferred into the main memory, and a display controller can utilize display refresh data without storing a second copy of the display refresh data and without using a CPU. An enhanced system can also include a partial drawing buffer where a graphics engine can write a portion of the display output data and transfer the portion of the display output data to a common memory subsystem for use during subsequent display updates after a display frame has been processed. An enhanced system can include a complete drawing buffer where a graphics engine can store the complete display output data and transfer the display output data for subsequent display updates. An enhanced system can include a graphics controller to perform 3D graphics functions and a texture cache for the graphics controller to fetch data from.

An enhanced system with a common display memory and main memory can include separate controls for each memory subsystem, an arbitration controller that takes the requests from multiple processor or peripheral subsystems, and a memory data path so that memory data can be provided by a memory subsystem to a processor or peripheral subsystem without preventing additional processor or peripheral subsystems from accessing other memory subsystems.

Those skilled in the art will recognize that this invention can be implemented with additional subsystems connected in series or in parallel to the disclosed subsystems, depending on the application. Therefore, the present invention is limited only by the following claims.

What is claimed is:

1. A computer system comprising:
   a common memory architecture including,
   a display memory,
   a main memory, and
   a plurality of memory subsystems, each memory subsystem coupled to one of a plurality of dedicated memory channels;
   a memory channel data switch and controller (DSC) unit coupled through said plurality of memory channels to each of said memory subsystems;
   an arbitration and control (A&C) unit for allocating access through said memory channel DSC unit to said memory subsystems;
   a central processing unit (CPU) subsystem controller unit for providing first signals through a first data bus and through an address and control bus to said memory channel DSC unit and to said A&C unit, respectively; and
   a graphics/drawing and display (GDD) subsystem for providing second signals through a second data bus and through said address and control bus to said memory channel DSC unit and to said A&C unit, respectively;
   wherein said memory channel DSC unit provides said GDD subsystem with access to any one of said plurality of memory subsystems and provides said CPU subsystem controller unit with concurrent access to any other of said plurality of memory subsystems.

2. The computer system of claim 1 further comprising:
   a peripheral bus and input/output control unit;
   a plurality of peripheral subsystems coupled to said peripheral bus and input/output control unit; and
   a data bus which is distinct from said first data bus and from said second data bus, which is coupled to said peripheral bus and input/output control unit, and which provides access for each of said plurality of peripheral subsystems to any of said memory subsystems.

3. The computer system of claim 2 wherein each of said plurality of peripheral subsystems is selected from the group consisting of a peripheral component interface (PCI), an accelerated graphics port (AGP), an input/output (I/O) bridge and a high speed serial I/O bus.

4. The computer system of claim 2 wherein said memory channel DSC unit, said A&C unit, said CPU subsystem controller unit, said GDD subsystem and said peripheral bus and input/output control unit together comprise an integrated enhanced system controller.

5. The computer system of claim 1 wherein said A&C unit produces third signals for receipt by said CPU subsystem controller unit and by said GDD subsystem.

6. The computer system of claim 5 wherein said A&C unit provides fourth signals to said memory channel DSC unit, and said DSC unit allocates said memory subsystem with a priority preference and a designated maximum latency tolerance to said CPU subsystem controller unit and said GDD subsystem.

7. The computer system of claim 1 wherein said memory channel DSC unit and said A&C unit comprise an integrated memory channel DSC unit.

8. The computer system of claim 1 wherein said GDD subsystem writes data into any of said plurality of memory subsystems.

9. The computer system of claim 1 wherein said GDD subsystem comprises a display subsystem and a graphics drawing subsystem.

10. The computer system of claim 1 wherein said GDD unit includes a partial drawing buffer and a graphics engine, said graphics engine writes display output data to said partial drawing buffer, and said partial drawing buffer transfers at least a portion of the display output to one of said memory subsystems for use during subsequent display updates.

11. The computer system of claim 10 wherein said partial drawing buffer is a complete drawing buffer and said portion of the display output data is the complete display output data.

12. The computer system of claim 1 wherein said GDD unit includes:
 a graphics controller to perform 3D graphics functions; and
 a texture cache from which said graphics controller can fetch data.

13. The computer system of claim 1 wherein said GDD subsystem is constructed to utilize display refresh data without storing a second copy of the display refresh data or using a CPU.

14. The computer system of claim 1 wherein said memory channel DSC unit includes:
 a plurality of controls, each control corresponding to a respective one of the plurality of memory subsystems;
 an arbiter for taking requests from multiple processor or peripheral subsystems; and
 a memory data path through which one of the plurality of memory subsystems provides memory data to a processor or peripheral subsystem while said path provides for access of another memory subsystem by any additional processor or peripheral subsystem.

15. A method for organizing a computer system having a common display memory and main memory, comprising:
 providing a plurality of memory subsystems within said common display memory and main memory, each memory subsystem having a dedicated memory channel;
 providing a memory channel data switch and controller (DSC) unit coupled to each of said memory subsystems through said dedicated memory channels; and
 providing a plurality of processor and/or peripheral subsystems including a graphics/drawing and display (GDD) subsystem and a central processing unit (CPU) subsystem controller unit, each of said processor and/or peripheral subsystems coupled to said memory channel data switch and controller unit;
  wherein said GDD subsystem can access any one of said plurality of memory subsystems and said CPU subsystem controller unit can concurrently access any other of said plurality of memory subsystems through said memory channel DSC unit.

* * * * *

UNITED STATES PATENT AND TRADEMARK OFFICE
CERTIFICATE OF CORRECTION

PATENT NO.   : 6,057,862
DATED        : May 2, 2000
INVENTOR(S)  : Neal Margulis Page 1 of 1

It is certified that error appears in the above-identified patent and that said Letters Patent is hereby corrected as shown below:

Column 1,
Line 61, replace "advanced peripheral" with --accelerated graphic--.

Column 4,
Line 6, replace "advanced peripheral" with --accelerated graphics--.

Signed and Sealed this

Seventeenth Day of July, 2001

Attest: *Nicholas P. Godici*

Attesting Officer

NICHOLAS P. GODICI
*Acting Director of the United States Patent and Trademark Office*